United States Patent [19]

Mitchell

[11] Patent Number: 4,911,249
[45] Date of Patent: Mar. 27, 1990

[54] TOOL WHICH USES SOIL AS WEARING EDGE

[75] Inventor: Ian A. Mitchell, Harrow, Australia

[73] Assignee: Ticonderoga Pty. Ltd., Melbourne, Australia

[21] Appl. No.: 102,653

[22] Filed: Sep. 30, 1987

[30] Foreign Application Priority Data

Sep. 30, 1986 [AU] Australia .............................. PH8259
Jun. 22, 1987 [AU] Australia ............................... PI2646

[51] Int. Cl.$^4$ .............................................. A01B 35/20
[52] U.S. Cl. ..................................... 172/719; 172/721; 172/730; 172/747
[58] Field of Search .............. 172/737, 719, 730, 731, 172/733, 747, 732, 735, 721, 720, 768, 765, 766, 767, 769, 770, 771, 21, 538; 37/141 R, 141 T, 142 A

[56] References Cited

U.S. PATENT DOCUMENTS

| Re. 30,705 | 8/1981 | Hines | 172/771 X |
| 476,348 | 6/1892 | Wistrand | 172/538 |
| 541,747 | 6/1895 | Hamilton | 172/771 X |
| 1,639,593 | 8/1927 | Dean | 172/733 |
| 1,648,843 | 11/1927 | Francis | 172/733 X |
| 2,987,838 | 6/1961 | Stratton | 37/142 A |
| 3,021,933 | 2/1962 | Wade | 193/9 |
| 3,040,638 | 6/1962 | Atkinson | 404/121 |
| 3,363,933 | 1/1968 | Wilson | 296/184 |
| 3,793,960 | 2/1974 | McKenry | 104/10 |
| 3,794,121 | 2/1974 | Drozak | 172/21 |
| 3,889,761 | 6/1975 | Rogers | 172/765 X |
| 3,923,104 | 12/1975 | Tibbs | 172/765 X |
| 4,058,171 | 11/1977 | van der Lely | 172/713 |
| 4,086,966 | 5/1978 | Lanz et al. | 172/767 |
| 4,197,918 | 4/1980 | Flippin | 172/699 |
| 4,326,348 | 4/1982 | Emrich | 172/719 X |
| 4,360,981 | 11/1982 | Bierwith et al. | 37/141 T |
| 4,506,739 | 3/1985 | Mascaro | 172/21 |
| 4,547,985 | 10/1985 | Silins et al. | 37/141 R X |

FOREIGN PATENT DOCUMENTS

| 0222797 | 1/1958 | Australia | 172/732 |
| 61774 | 11/1980 | Australia . | |
| 86138308 | 7/1986 | Fed. Rep. of Germany . | |

Primary Examiner—Randolph A. Reese
Assistant Examiner—Jeffrey L. Thompson
Attorney, Agent, or Firm—Bernard, Rothwell & Brown

[57] ABSTRACT

A soil-working tine has a recess extending along its wearing edge. The recess captures some soil as the tine passes through the soil. The soil captured in the recess acts as a wearing edge, reducing wear on the material of the tine.

7 Claims, 4 Drawing Sheets

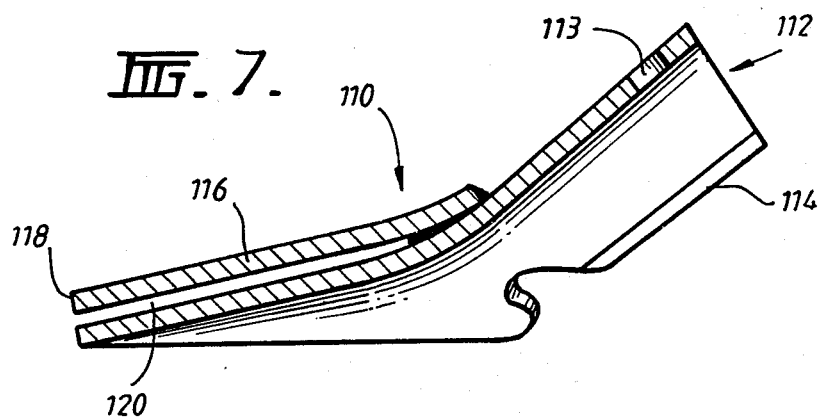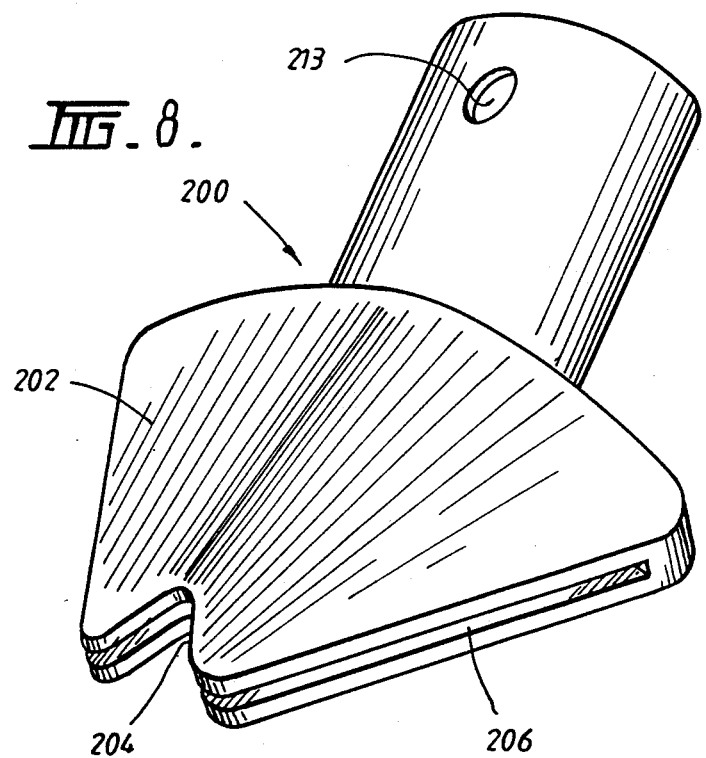

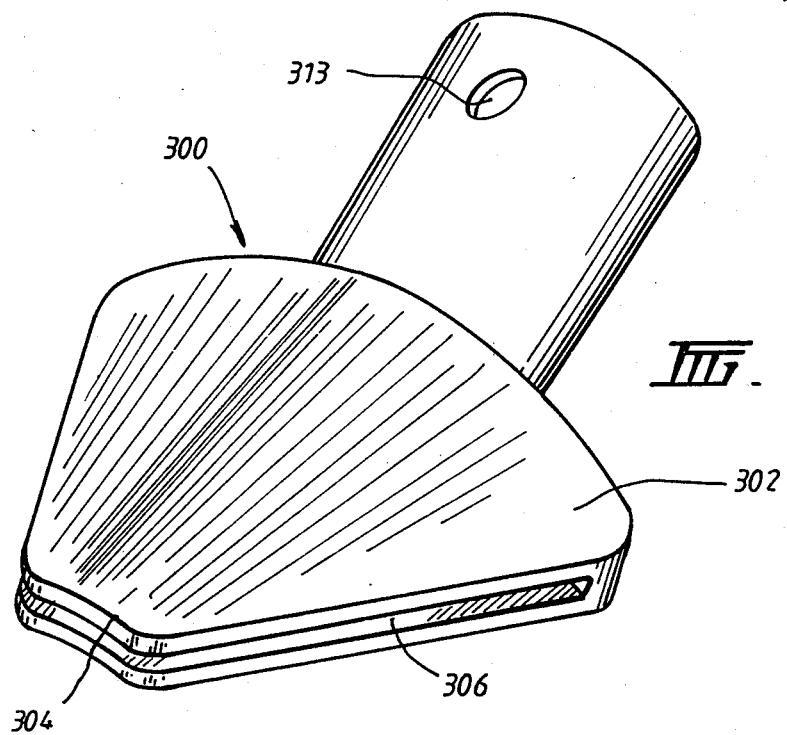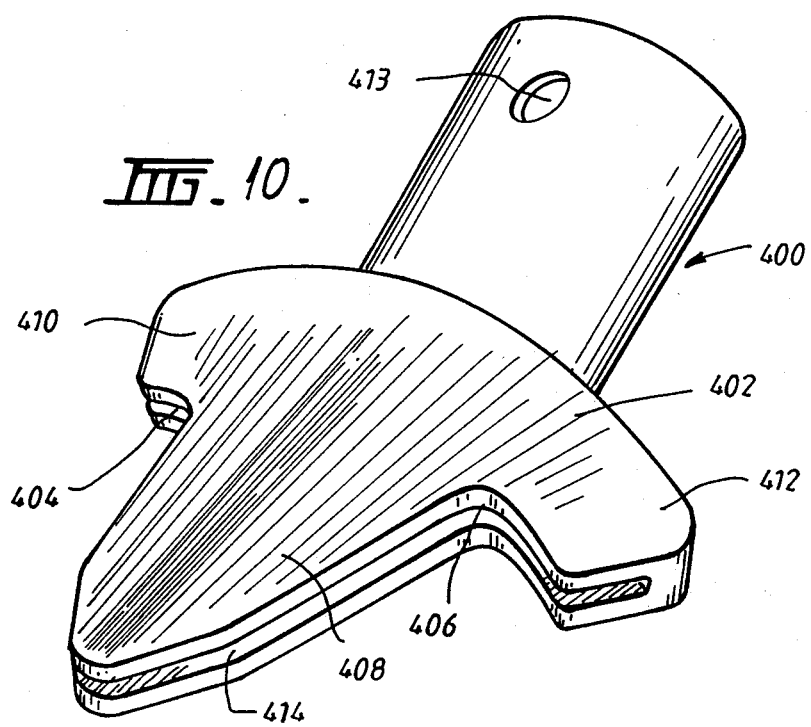

TOOL WHICH USES SOIL AS WEARING EDGE

BACKGROUND OF THE INVENTION

1. Field of the Invention

This invention relates to tools for working media, such as agricultural tools used to work soil.

2. Description of the Prior Art

A major problem associated with the use of tools to work media is wear. A particular example can be seen in the practice of deep drilling.

Deep drilling is a seeding operation in which previously unworked rain-softened ground is worked to make an opening in the soil for the deposit of seed therein. Various types of tool design have been suggested for use in such operations, but a major problem is wear. Some tools have to be replaced daily due to wear, notwithstanding that they are formed from expensive wear-resisting alloys.

BRIEF SUMMARY OF THE INVENTION

It is an object of this invention to provide a tool designed to wear less than equivalent prior art tools.

The invention provides a tool for working a medium wherein said tool is adapted to use part of the said medium as a wearing surface or edge.

Preferably, the tool includes a portion which receives material, and provides for the front surface, relative to the intended direction of movement of the tool in the medium, of the tool to be at least in part constituted by some of the said medium.

Preferably, the tool includes a recess adapted to receive part of the medium as the tool is advanced through the medium.

Preferably, the recess is located in the leading edge of the tool.

BRIEF DESCRIPTION OF THE DRAWINGS

FIG. 7 is a longitudinal cross-section of the embodiment of FIG. 5;

FIG. 8 is a perspective view from above of a fifth embodiment of the tool according to the invention;

FIG. 9 is a perspective view from above of a sixth embodiment of the tool according to the invention; and FIG. 10 is a perspective view from above of a seventh embodiment of the tool according to the invention.

DETAILED DESCRIPTION OF THE PREFERRED EMBODIMENTS

All of the seven described embodiments of the invention are tines for working soil in agriculture, but it is stressed that the invention relates to tools or the like for working any medium for any purpose.

Figure 1:
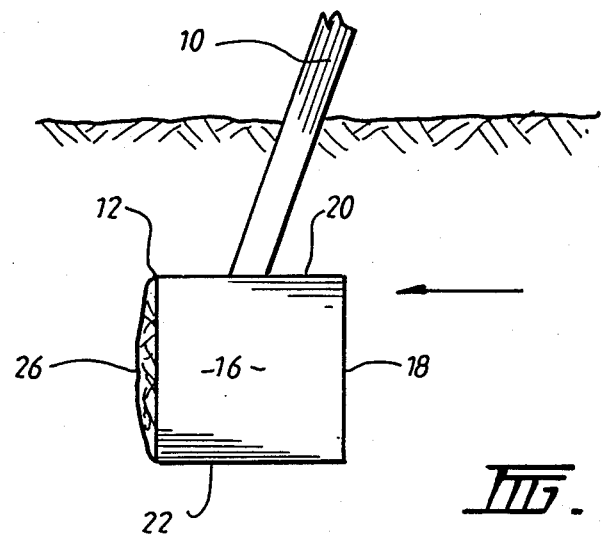
FIG. 1 is a side elevation of one embodiment of a tool according to the invention.

In FIG. 1, an agricultural apparatus (not shown) includes a support 10 which depends from a gang (not shown) or the like, to which support 10 is secured a ground working tool 12. The tool is moved through soil in the direction of the arrow.

Figure 2:
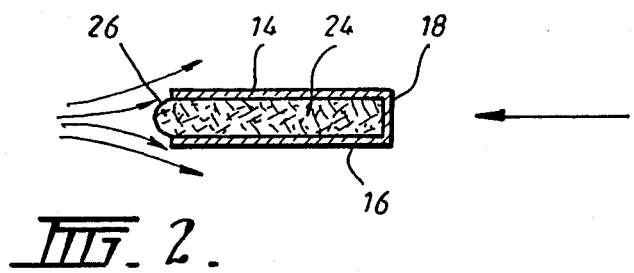
FIG. 2 is a horizontal cross-section through the tool of FIG. 1.

In FIG. 2, it can be seen that the tool 12 is hollow, having side walls 14, 16, rear wall 18, and top and bottom walls 20, 22 (FIG. 1). Preferably, the tool is formed from a metal.

The invention operates on the principle that as the tool 12 is advanced in the direction of the right-hand arrow in FIG. 2, some of the soil 24 through which the tool 12 is moving lodges in the hollow portion of the tool 12, building up to a forward edge 26 which acts as a working edge. Having the working edge formed from the soil itself reduces wear on the metal parts of the tool, and thus the need to replace the tool so often is also reduced.

Figure 3:
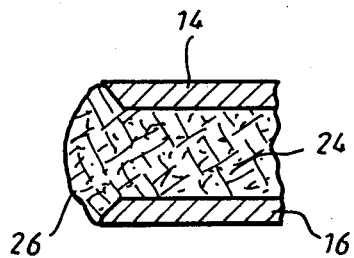
FIG. 3 is an enlarged view in cross-section of the front end of a second embodiment of the tool according to the invention.
Figure 4:
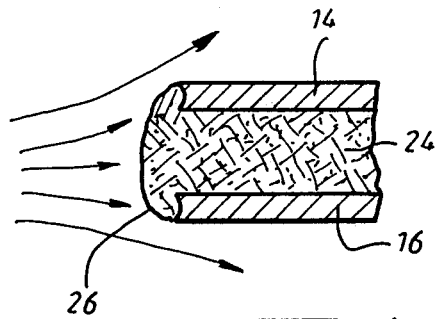
FIG. 4 is an enlarged view in cross-section of a third embodiment of the tool according to the invention.

FIGS. 3 and 4 show details of alternative leading edges of walls 14, 16 (and of walls 20, 22 (not shown)) which may enhance the reduction of wear. FIG. 3 shows angled leading edges, and FIG. 4 shows leading edges having recesses. Of course, other end profiles could be used, and it is also clear that any shape of tool could be used, provided that the tool allowed for the build-up of a cutting edge or surface using the material through which the tool is to be or is being moved. Other examples of tool shapes are shown in FIGS. 5 to 10 and described hereinafter.

In FIGS. 2 and 4, the relative movement of soil to and past the edge 26 is shown by the smaller arrows. It is considered that aspects of fluid flow theory may be used to explain the operation of the invention, as soil (and other media formed from solid particles) may under certain circumstances be seen as approximating a fluid.

Figure 5:
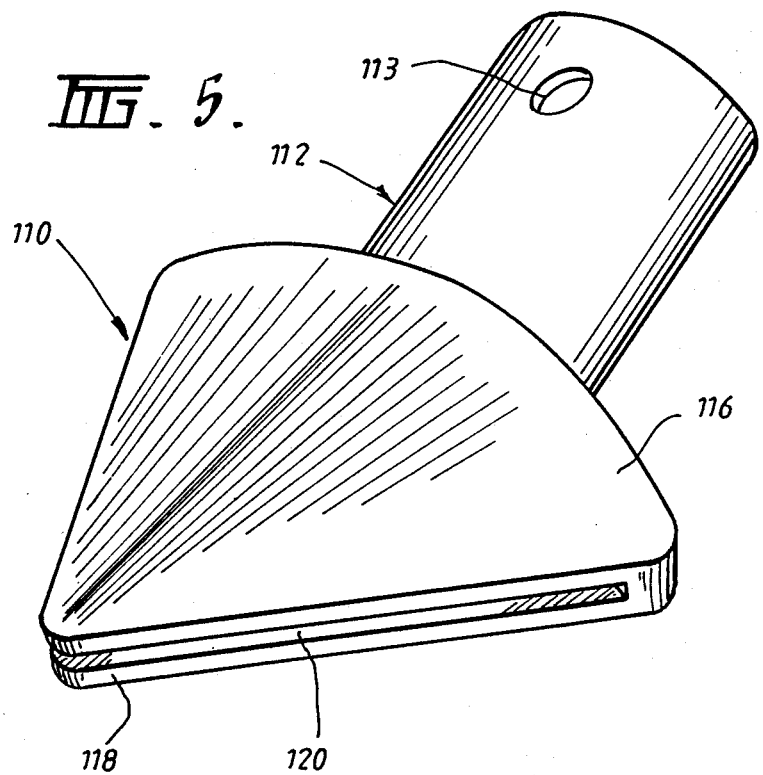
FIG. 5 is a perspective view from above of a fourth embodiment of the tool according to the invention.
Figure 6:
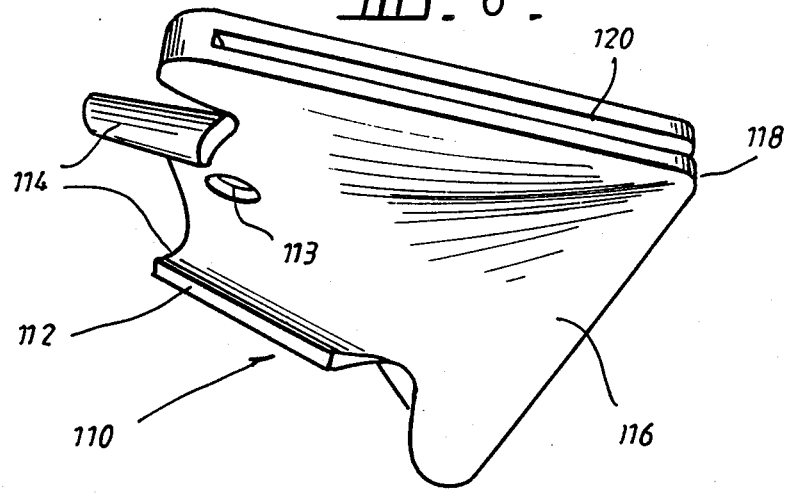
FIG. 6 is a perspective view from beneath of the embodiment of FIG. 5.

Turning now to FIGS. 5 to 7, there is illustrated a tine 110 including an attachment portion 112 (which may take any form, not just the one illustrated, which has depending curved walls 114 for a press-fit to a tine holder (not shown)). An aperture 113 is provided for a more conventional attachment to a tine holder, by a bolt, pin or the like. Working body 116 is generally triangular in shape, with a curved structure providing a convex upper surface.

Extending around the soil-working edge 118 of the body 116 there is a recess 120, which may be of any suitable depth. Body 116 may be constructed by using an upper element and a lower element, welded or otherwise secured together so as to leave a space between the elements, at least at the working area 118, or may be formed in a single piece.

As described earlier, the recess or the like 120, in use, fills with the soil being worked, thereby producing a wearing surface from the soil itself.

The tool 200 of FIG. 8 is similar to that of FIGS. 5 to 7, except that body 202 has a notch 204 in the 'point' area. Recess 206 extends along the entire working edge. Aperture 213 corresponds to aperture 113 in FIGS. 5 to 7.

FIG. 9 shows a tool 300 which is also similar to that of FIGS. 5 to 7. Body 302 has a 'shovel' nose 304. Again, a recess 306 runs along the working area of the tool, and an aperture 313 is provided, similar to aperture 113.

Finally, the tool 400 of FIG. 10 is also similar to that of FIGS. 5 to 7, except that body 402 has portions 404, 406, in effect, cut out, leaving a leading portion 408 and 'wings' 410, 412. Recess 414 extends along the working areas, and aperture 413 is used to attach the tine 400 to a tine holder.

In each of the embodiments, the preferred material is mild steel, it being discovered that the minimization of wear allows a softer material to be used.

Although the manner in which wear is minimized is not well understood, it is a fact that in tests of the tools of FIGS. 5 to 10, it has been demonstrated that wear is significantly reduced, in comparison with conventional tools.

It is to be understood that in working other media, the tool or the like may be formed from other materials. For example, for some softer media, the tool may be formed of a plastics material.

I claim:

1. A tool for working a medium, said tool comprising a leading edge portion, means for positioning the leading edge portion within the medium continuously during use and for advancing said leading edge portion through said medium in a single direction during use, said leading edge having a recess therein for collecting a portion of said medium when said tool is advanced through said medium, said leading edge and said recess being configured so as to advance part of said portion of said medium ahead of said leading edge such that it forms a wearing surface which minimizes wear on said leading edge.

2. A tool according to claim 1, comprising a generally hollow body formed by side walls, top and bottom walls, and a rear wall, there being an opening at the front of said body through which said portion of the medium may pass to fill the interior of said body, and provide said wearing edge.

3. A tool according to claim 1, wherein the tool is a tine adapted to be attached to a tine holder, the tine having a generally V-shaped leading edge.

4. A tool according to claim 3, wherein said tine includes an attachment portion adapted to be press-fitted to a tine holder.

5. A tool according to claim 1, wherein the tool is a tine having a generally V-shaped leading edge, there being a Vshaped notch in the point of the V-shape.

6. A tool according to claim 1, wherein said tool is a tine and has a generally V-shaped leading edge, there being a cut-off portion at the point of said V-shape.

7. A tool according to claim 1, wherein the tool is a tine, the tine having a generally V-shaped leading edge with two winged portions.

* * * * *